United States Patent
Atkinson (10) Patent No.: US 9,411,382 B2
(45) Date of Patent: Aug. 9, 2016

(54) ROTATABLE DISPLAY ASSEMBLY

(75) Inventor: Lee Atkinson, Taipei (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 1244 days.

(21) Appl. No.: 13/003,333

(22) PCT Filed: Jul. 10, 2008

(86) PCT No.: PCT/US2008/069715
§ 371 (c)(1),
(2), (4) Date: Jan. 10, 2011

(87) PCT Pub. No.: WO2010/005440
PCT Pub. Date: Jan. 14, 2010

(65) Prior Publication Data
US 2011/0110670 A1    May 12, 2011

(51) Int. Cl.
*G06F 1/16* (2006.01)
*H04B 10/80* (2013.01)

(52) U.S. Cl.
CPC .............. *G06F 1/1683* (2013.01); *G06F 1/162* (2013.01); *G06F 1/1681* (2013.01); *H04B 10/803* (2013.01); *H04B 10/806* (2013.01)

(58) Field of Classification Search
CPC ..... G06F 1/1683; G06F 1/1681; G06F 1/162; H04B 10/803; H04B 10/806
See application file for complete search history.

(56) References Cited

U.S. PATENT DOCUMENTS

| 5,949,565 | A | 9/1999 | Ishida | |
| 7,636,523 | B2 * | 12/2009 | Schorpp | 398/153 |
| 2006/0203014 | A1 | 9/2006 | Lev et al. | |
| 2007/0065158 | A1 * | 3/2007 | Shindou et al. | 398/164 |
| 2007/0297727 | A1 | 12/2007 | Ueno et al. | |
| 2008/0308755 | A1 * | 12/2008 | Hashizume et al. | 250/553 |

FOREIGN PATENT DOCUMENTS

KR    10-1999-0054612    7/1999

OTHER PUBLICATIONS

The International Search Report and the Written Opinion of the International Searching Authority for International Application No. PCT/US2008/069715 dated Mar. 11, 2009.

* cited by examiner

*Primary Examiner* — Leslie Pascal
(74) *Attorney, Agent, or Firm* — HP Inc Patent Department (57) ABSTRACT

A rotatable display assembly is provided. The rotatable display assembly includes a base unit, a display unit and a wireless transmission system. The display unit is rotatably coupled to the base unit using at least one pivotal means, and the wireless transmission system is adapted to transmit data wirelessly between the base unit and the display unit.

17 Claims, 9 Drawing Sheets

ROTATABLE DISPLAY ASSEMBLY

FIELD OF THE INVENTION

This invention relates generally to rotatable display assembly, and in particular, to a rotatable display assembly that can be used in electronic devices such as portable computers.

BACKGROUND OF THE INVENTION

A portable computer, such as a notebook, typically includes a variety of parts, such as motherboard, processor, hard disk, keyboard, power supply and display screen. The motherboard, processor, hard disk, power supply and the keyboard are usually housed in a main body. The display screen is housed in a display unit which is separate form the main body. The display unit is connected to the main body by a hinge which allows the display unit to be folded onto the main body, that is, in a fore and aft direction.

In some notebook models, such as a tablet PC, the display unit is connected to the main body by a swivel hinge so that the display unit can be rotated horizontally with respect to the main body. Thus, the display unit can be both folded in the fore and aft direction, and rotated horizontally. In this way, a user of the notebook may rotate the display unit to show the display screen to other people, or even fold the display unit onto the main body with the display screen facing outwards and away from the main body for presentation purposes.

In such a notebook with rotatable screen, cables run through the hinge from the main body to the display unit to supply power and to transmit data to the display screen. Due to the cables passing through the hinge, the hinge is constructed in a manner where the angle of rotation is restricted. In other words, the display unit cannot be rotated indefinitely in any given direction. Also, when the display unit is rotated in one direction, it has to be rotated back to its original position in the opposite direction. For example, if the display unit is rotated in the clockwise direction, it has to be rotated back to its original position in the anti-clockwise direction. This is because the cables through the hinge cannot be infinitely twisted. Furthermore, the frequent twisting of the cables when the display unit is being rotated may cause the cables to wear out or break. In addition, the cables through the hinge also occupy a significant amount of physical space. Therefore, the minimal size of the hinge is also restricted.

SUMMARY OF THE INVENTION

According to an embodiment, a rotatable display assembly is provided. The rotatable display assembly includes a base unit, a display unit and a wireless transmission system. The display unit is rotatably coupled to the base unit using at least one pivotal means, and the wireless transmission system is adapted to transmit data wirelessly between the base unit and the display unit.

BRIEF DESCRIPTION OF THE DRAWINGS

The embodiments of the invention will be better understood in view of the following drawings and the detailed description.

DETAILED DESCRIPTION OF THE INVENTION

Figure 1:
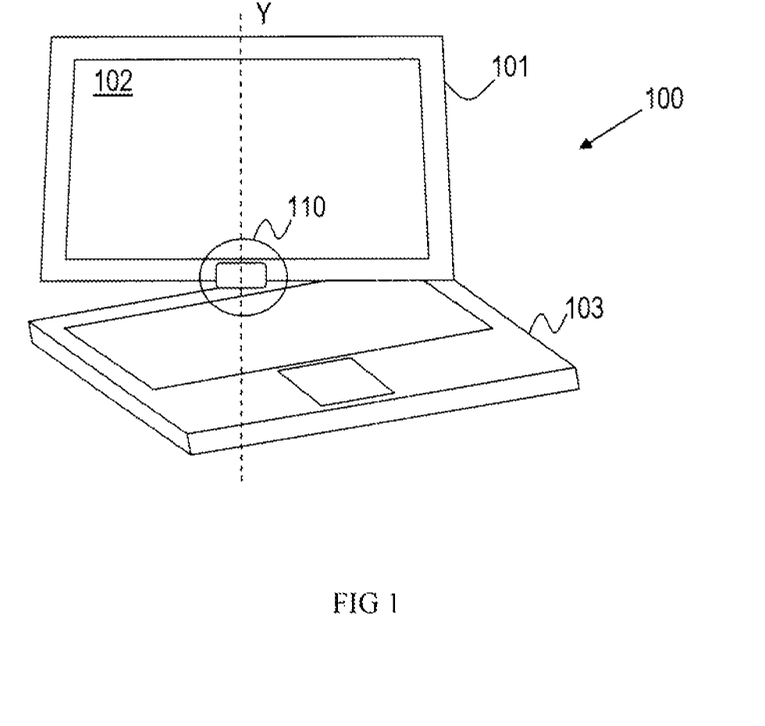
FIG. 1 shows an example of a table PC in which a rotatable display assembly according to an embodiment may be implemented.

The embodiments described henceforth relate to a rotatable display assembly that can be used in electronic devices. Examples of electronic devices include portable computers (tablet PC, notebook) and mobile phones. FIG. 1 shows an example of a tablet PC 100 in which the rotatable display assembly may be implemented. The tablet PC 100 includes a display unit 101 which houses a LCD screen 102. The display unit 101 is connected to a base unit 103 using a hinge 110. The display unit 101 can be moved in a fore and at direction, so that the display unit 101 is foldable onto a top surface of the base unit 103. In addition, the display unit 101 can be rotated with respect to the base unit 103, about an axis Y substantially perpendicular to a horizontal plane of the base unit 103.

Data to be displayed on the LCD screen 102 are transmitted from a video graphic controller in the base unit 103 to the LCD screen 102 in the display unit 101. According to an embodiment, data for display on the LCD screen 102 are transmitted wirelessly from the base unit 103 to the display unit 101. Accordingly, the display unit 101 may be rotated about the axis Y in an unrestricted manner. In other words, the display unit 101 can have an unlimited angle of rotation with respect to the base unit 103.

Figure 2:
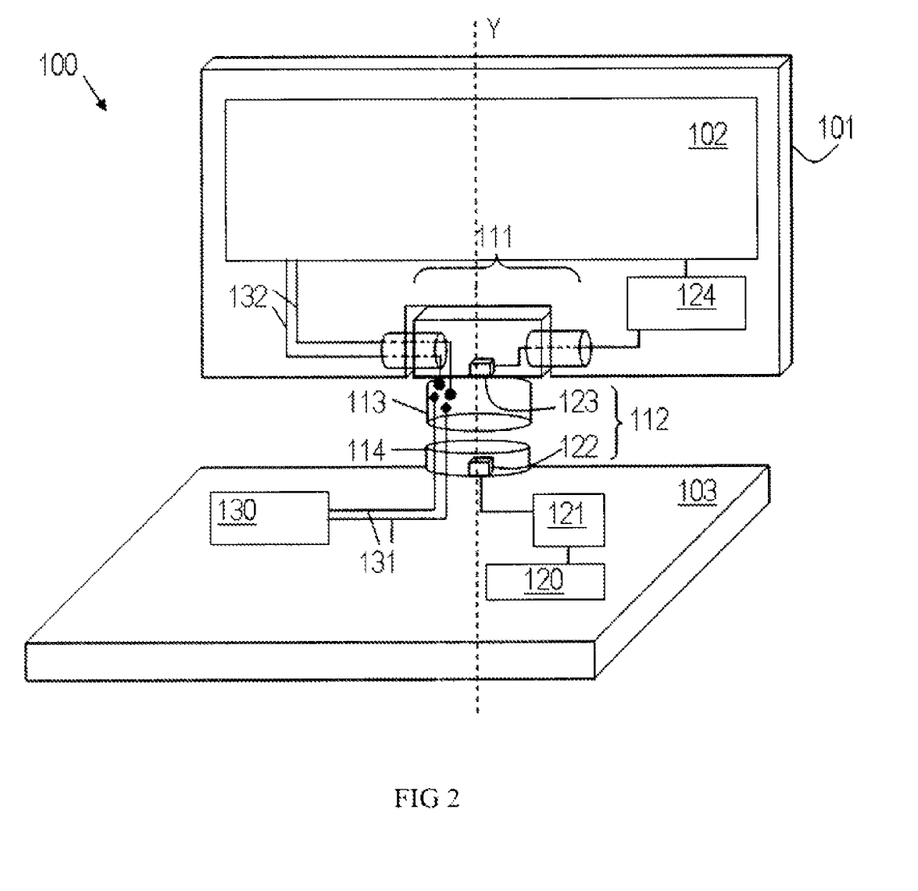
FIG. 2 shows an interior of the tablet PC illustrating an example of an implementation of the rotatable display assembly according to an embodiment.

FIG. 2 shows an interior of the tablet PC 100 illustrating an implementation of the rotatable display assembly according to an embodiment. It should be noted that only components which illustrate the rotatable display assembly are shown in FIG. 2. Other components commonly found in tablet PCs, such as keyboard, I/O interfaces, CPU, memories, etc, are not included in the figure so as not to obscure the description of the rotatable display assembly. Also, the implementation of the rotatable display assembly shall not be limited to the tablet PC as shown in FIG. 2. It can also be implemented in other electronic devices such as a mobile phone, a portable DVD player or other devices having a rotatable screen.

The rotatable display assembly includes the display unit 101, the base unit 103 and a wireless transmission system for transmitting data wirelessly from the base unit 103 to the display unit 101. The display unit 101 is connected to the base unit 103 via a first hinge 111 and a second hinge 112. The first hinge 111 allows the display unit 101 to move in the fore and aft direction. The second hinge 112 allows the display unit 101 to rotate with respect to the base unit 103, about the axis Y. The second hinge 112 includes a first (upper) tubular structure 113 and a second (lower) tubular structure 114. The first tubular structure 113 is attached to the display unit 101 and the second tubular structure 114 is attached to the base unit 103. The first tubular structure 113 is rotatable with respect to the second tubular structure 114.

It should be noted that the first and second hinges 111, 112 is only a general illustration of the hinge structures in order to describe the structure and operation of the rotatable display assembly. They do not represent the exact structure of hinges that is used in a tablet PC. Such hinge structures are known to one of ordinary skill in the art. The rotatable display assembly may also be implemented in electronic devices employing a variety of other hinge structures which allow the display unit 101 to rotate with respect to the base unit 103.

The wireless transmission system includes a graphic controller 120, transmitter circuitries 121, an optical transmitter 122, an optical receiver 123 and receiver circuitries 124. The graphic controller 120, transmitter circuitries 121 and the optical transmitter 122 are arranged in the base unit 103. The optical receiver 123 and the receiver circuitries 124 are arranged in the display unit 101. The optical transmitter 122 is arranged in the hollow space of the second tubular structure 114 and the optical receiver 123 is arranged in the hollow space of the first tubular structure 113, such that both the optical transmitter and receiver 122, 123 are optically coupled to each other. In other words, both the optical transmitter and, receiver 122, 123 are in the line of sight to each other. Accordingly, data sent from the optical transmitter 122 in the form of modulated optical signal is received by the optical receiver 123.

The optical transmitter 122 is electrically coupled to the transmitter circuitries 121, which in turn is electrically coupled to the graphic controller 120. The optical receiver 123 is electrically coupled to the receiver circuitries 124, which in turn is electrically coupled to the LCD screen 102. Accordingly, data output from the graphic controller in the base unit 103 is transmitted to the display unit 101 to be displayed on the LCD screen 102.

Figure 3:
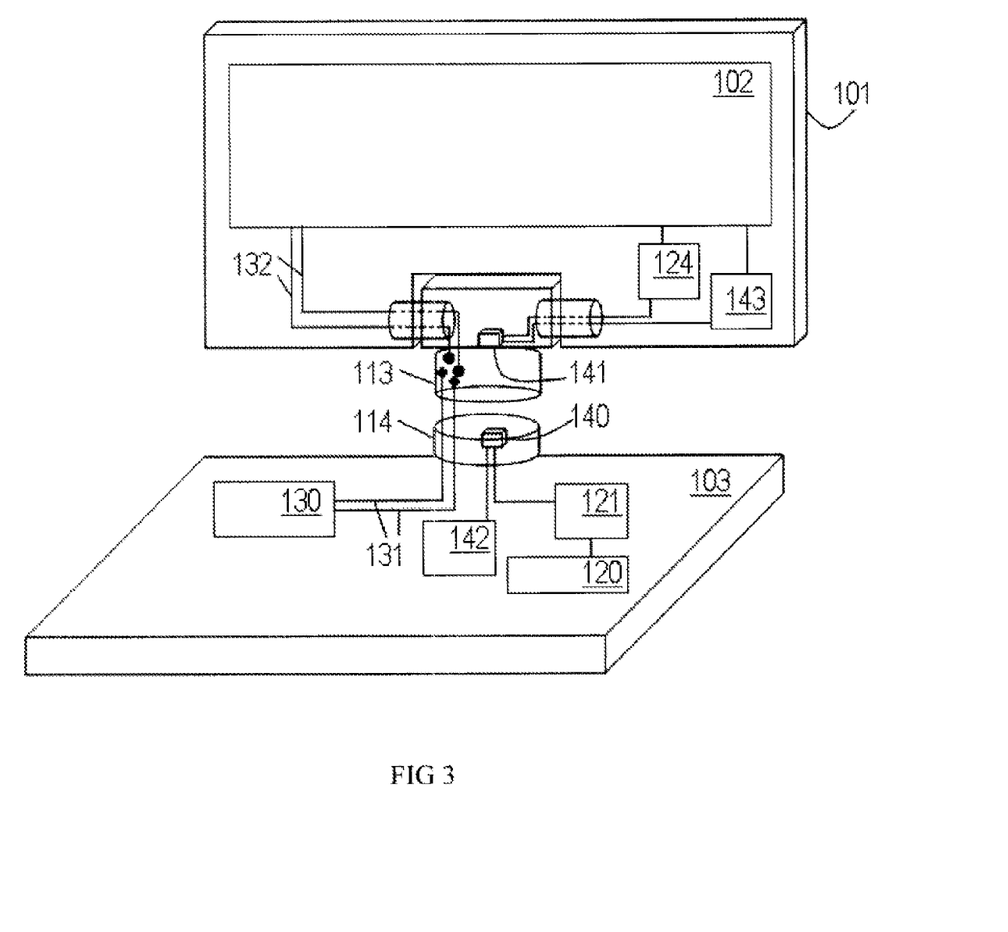
FIG. 3 shows an implementation of the rotatable display assembly according to another embodiment.

It is also possible that the LCD screen 102 is touch-sensitive, so that a user may provide input to the tablet PC 100 by touching the LCD screen 102. Therefore, data may also be transmitted from the display unit 101 to the base unit 103. Such an implementation is illustrated in FIG. 3. With reference to FIG. 3, the wireless transmission system includes two transceiver modules 140, 141, two transmitter circuitries 121, 143, two receiver circuitries 124, 142 and the graphic controller 120.

One of the optical transceivers 140 is arranged in the hollow space of the second tubular structure 114. The optical transceiver 140 includes an optical transmitter and an optical receiver (not shown). The optical transmitter in the optical transceiver 140 is electrically coupled to the transmitter circuitries 121, which in turn is electrically coupled to the graphic controller 120. The optical receiver in the optical transceiver 140 is electrically coupled to the receiver circuitries 142, which in turn may be electrically coupled to an I/O interface (not shown) for processing the input from the user.

The other optical transceiver 141 is arranged in the hollow space of the first tubular structure 113. The optical transceiver 141 includes an optical transmitter and an optical receiver (not shown). The optical receiver in the optical transceiver 141 is electrically coupled to the receiver circuitries 124, which in turn is electrically coupled to the LCD screen 102. The optical transmitter in the optical transceiver 141 is electrically coupled to the transmitter circuitries 143, which may in turn be electrically coupled to an interface of the LCD screen 102 to receive user input. Accordingly, data may be both transmitted from the base unit 103 to the display unit 101, and from the display unit 101 to the base unit 103.

Figure 4:
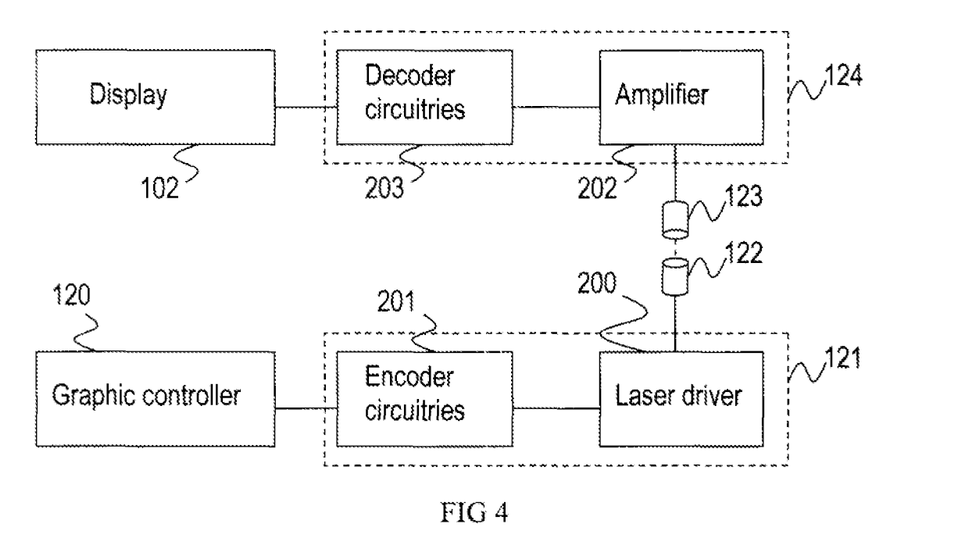
FIG. 4 a block diagram of a wireless transmission system according to an embodiment.

FIG. 4 shows a block diagram of the wireless transmission system according to an embodiment. As already described with reference to FIG. 2, the wireless transmission system includes the graphic controller 120, the transmitter circuitries 121, the optical transmitter 122, the optical receiver 123 and the receiver circuitries 124. The transmitter circuitries 121 include encoder circuitries 201 and a laser driver 200. The receiver circuitries 124 include decoder circuitries 203 and an amplifier 202.

The graphic controller 120 (or VGA chip) outputs serial data to be displayed on the LCD screen 102. An example of the output data is the DisplayPort output of a computer graphics engine. The output data is received by the encoder circuitries 201. The encoder circuitries 201 encode the serial data from the graphic controller 120. When there are more than one input sources to the encoder circuitries 201, the encoder circuitries 201 may include a multiplexer to multiplex the various input data to form a single stream of data prior to encoding. The encoder circuitries 201 may also include error correction so that any data loss or error in the process of transmission can be corrected at a later decoding stage.

The encoded data from the encoder circuitries 201 is received by the laser driver 200. The laser driver 200 modulates the encoded data into electrical pulses for controlling the optical transmitter 122. The optical transmitter 122 includes a laser diode which emits a series of light pulses in response to the electrical pulses from the laser driver 200. An example of the laser diode 122 is the Optoway DL-3100. The series of light pulses is received by the optical receiver 123 which is optically coupled to the laser diode 122. The optical receiver 123 includes a photodiode which detects light incident on it. An example of the photodiode is the Optoway PD-1100.

The photodiode demodulates the received light pulses into electrical signal. The electrical signal is received by the amplifier 202. The amplifier 202 amplifies the electrical signal. The amplifier 202 may include a transimpedance amplifier to covert the received electrical signal into corresponding voltage signal before amplifying it. The amplifier 202 may include a differential output compatible with DisplayPort signaling. The amplified signal is sent to the decoder circuitries 203 to be decoded.

If error correction was performed by the encoder circuitries 201, the decoder circuitries 203 may perform data recovery for the amplified signal before decoding it. The decoded signal may be de-multiplexed by a de-multiplexer (if it was multiplexed at the encoder end) before it is sent to the LCD screen 102 to be displayed.

Figure 5:
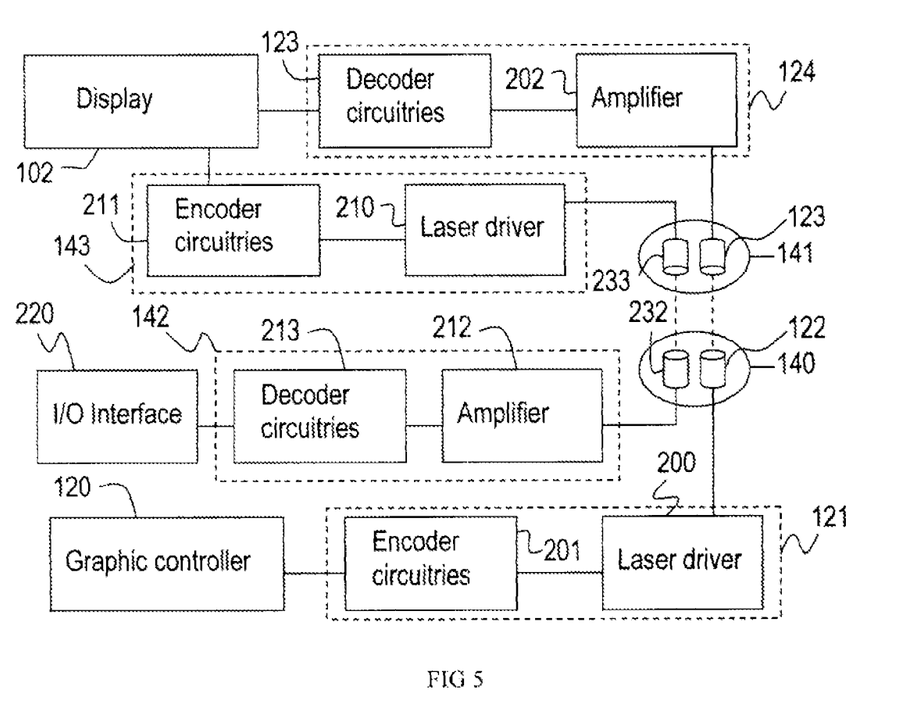
FIG. 5 a block diagram of the wireless transmission system according to another embodiment.

FIG. 5 shows a block diagram of the wireless transmission system according to another embodiment. The wireless transmission system shown in FIG. 5 corresponds to the wireless transmission system as described above with reference to FIG. 3 which includes the transceiver modules 140, 141, the transmitter circuitries 121, 143, the receiver circuitries 124, 142 and the graphic controller 120. The transmitter circuitries 143 include encoder circuitries 211 and a laser driver 210. The receiver circuitries 142 include decoder circuitries 213 and an amplifier 212.

The decoder circuitries 213 are electrically coupled to the I/O interface 220. The I/O interface 220 processes input data received from the touch-sensitive display 102. The transceiver module 141 includes an optical transmitter 233 and the optical receiver 123. Similarly, the transceiver module 140 includes the optical transmitter 122 and an optical receiver 232. The descriptions and functions of each block are similar to those described in FIG. 3 and FIG. 4, and will not be repeated here.

With reference to either FIG. 2 or FIG. 3 again, a power supply unit 130 supplies power to the display unit 101 through the second hinge 112. In the example shown in FIG. 2, a pair of power cables 131 contacts the first tubular structure 113 to supply electrical power thereto. Another pair of power cables 132 also contacts the first tubular structure 113 and makes electrical contact with the pair of power cables 131 to supply electrical power to the display unit 101 specifically to the LCD screen 102.

Figure 6:
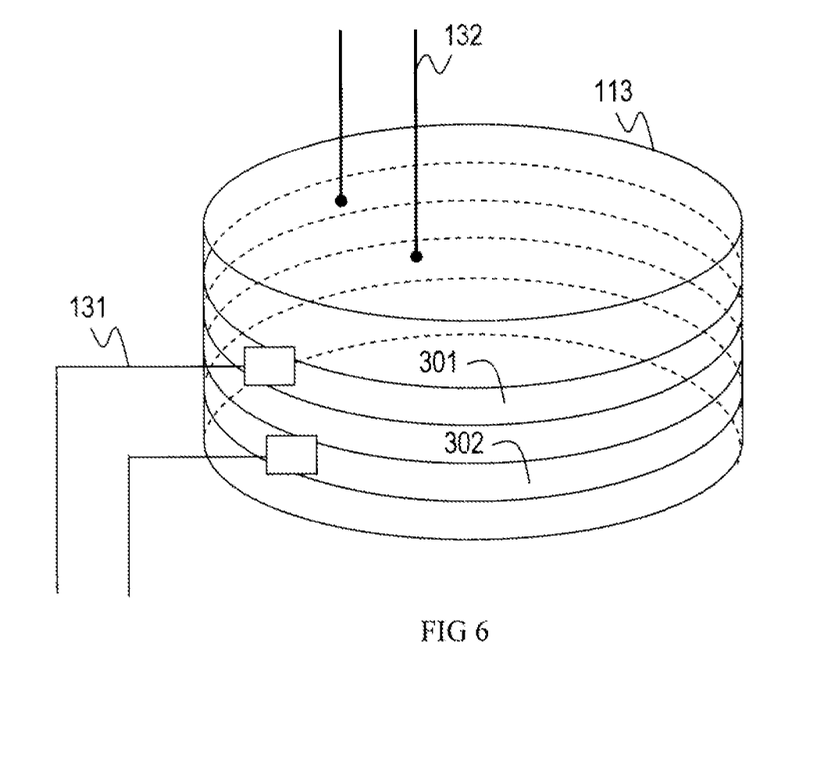
FIG. 6 shows an example of how electrical contacts may be made by power cables according to an embodiment.

FIG. 6 shows an example of how electrical contacts may be made by the power cables according to an embodiment. In this example, the first tubular structure 113 includes a first conducting ring 301 and a second conducting ring 302. One of the power cables 131 (Vcc) from the power supply unit 130 electrically contacts the first conducting ring 301. The other power cable 131 (Ground) electrically contacts the second conducting ring 302. Similarly, a corresponding Vcc power cable 132 from the display unit 101 electrically contacts the first conducting ring 301 and a corresponding Ground power cable 132 electrically contacts the second conducting ring 302. Accordingly, power is supplied from the power supply unit 130 to the display unit 101 through the second hinge 112.

Since the first tubular structure 113 is attached to the display unit 101 and does not rotate with respect to the display unit 101, the power cables 132 do not need to move with respect to the first tubular structure 113. Accordingly, the electrical contacts between the power cables 132 and the conducting rings 301, 302 may be formed, for example, by welding. As the first tubular structure 113 is rotatable with respect to the base unit 103, it is also movable with respect to the power cables 131. Accordingly, the power cables 131 may electrically contact the conducting rings 301, 302 using brush contacts. This allows the conducting rings 301, 302 to be slidable with respect to the power cables 131, and still maintain electrical contacts.

It should be noted that other possible means of electrical contacts are possible as known to one of ordinary skill in the art. Also, power may also be supplied to the display unit 101 through the second tubular structure 114 instead of the first tubular structure 113 in another example. In such an example, the power cables 131 from the power supply unit 130 may be fixed to the conducting rings 301, 302 by welding, and the power cables 132 from the display unit 101 contacts the conducting rings 301, 302 using brush contacts.

Figure 7:
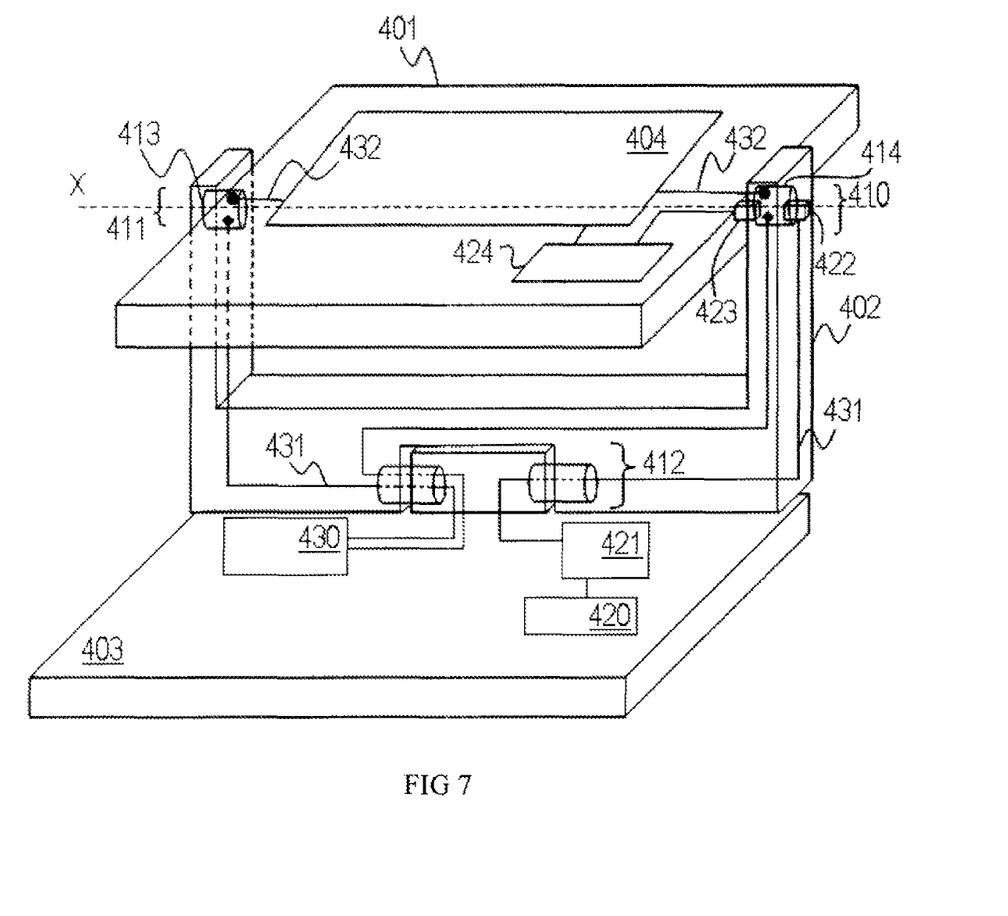
FIG. 7 shows another example of an implementation of the rotatable display assembly according to another embodiment.

FIG. 7 shows another example of an implementation of the rotatable display assembly according to another embodiment. The rotatable display assembly is implemented in a notebook having a display unit 401 which is rotatable with respect to a display frame 402. The display unit 401 is supported by the display frame 402 by a first pivoting means 410 and a second pivoting means 411, such that the display unit 401 is rotatable about an axis X.

Similar to the embodiment described with reference to FIG. 2, the rotatable display assembly includes the display unit 401, a base unit 403 and a wireless transmission system for transmitting data wirelessly to the display unit 401. The display unit 401 is connected to the display frame 402 via the two pivoting means 410, 411. The display frame is in turn connected to the base unit 403 via a hinge 412. The hinge 412 allows the display frame 402, and hence the display unit 401, to move in the fore and aft direction. The two pivoting means 410, 411 allow the display unit 401 to rotate with respect to the display frame 402, about the axis X.

The first pivotal means 410 include a tubular structure 414 which is attached to the display unit 401. The display frame 402 includes a corresponding hole or socket (not shown) for receiving the tubular structure 414. Similarly, the second pivotal means 411 also include a tubular structure 413 attached to the display unit 401 and the display frame 402 includes another corresponding hole or socket (not shown) for receiving the tubular structure 413.

The wireless transmission system includes a graphic controller 420, transmitter circuitries 421. an optical transmitter 422, an optical receiver 423 and receiver circuitries 424. The graphic controller 420, transmitter circuitries 421 are arranged in the base unit 403. The optical transmitter 422 is arranged in the display frame 402. The optical receiver 423 and the receiver circuitries 424 are arranged in the display unit 401. The optical transmitter 422 is arranged in the socket of the display frame 402 and the optical receiver 423 is arranged in the hollow space of the tubular structure 414, such that both the optical transmitter and receiver 422, 423 are optically coupled to each other. Accordingly, data sent from the optical transmitter 422 in the form of modulated optical signal is received by the optical receiver 423.

The optical transmitter 422 is electrically coupled to the transmitter circuitries 421, which in turn is electrically coupled to the graphic controller 420. The optical receiver 423 is electrically coupled to the receiver circuitries 424, which in turn is electrically coupled to a LCD screen 404 in the display unit 401. Accordingly, data output from the graphic controller in the base unit 403 is transmitted to the display unit 401 to be displayed on the LCD screen 402. The descriptions and functions of the various components of the rotatable display assembly in this embodiment are similar to those described with reference to FIGS. 2-5, and will not be repeated here.

Figure 8:
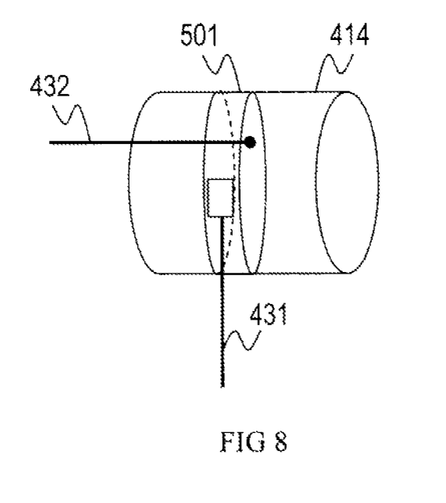
FIG. 8 shows an example of how electrical contacts may be made by power cables at pivoting means according to another embodiment.

FIG. 8 shows an example of how electrical contacts may be made by the power cables 431, 432 at the pivoting means 410, 411 according to an embodiment. The tubular structure 413, 414 includes a conducting ring 501. Both the power cables 431, 432 from the power supply unit 430 and the display unit 401 electrically contact the conducting ring 501. In the example shown in FIG. 8, since the tubular structure 414 at the pivoting means 410 is attached to the display unit 401 and does not rotate with respect to the display unit 401, the power cable 432 from the display unit 401 does not need to move with respect to the tubular structure 414. Accordingly, the electrical contact between the power cables 432 and the conducting ring 501 may be formed, for example, by welding. As the tubular structure 414 is rotatable with respect to the display frame 402, it is also movable with respect to the power cable 431 from the power supply unit 430. Accordingly, the power cable 431 may electrically contact the conducting ring 501 using brush contacts. This allows the conducting ring 501 to be slidable with respect to the power cable 531 and still maintain electrical contacts. The same type of electrical contacts are used at the tubular structure 413 at the pivoting means 411, to electrically connect the power cable 432 from the LCD screen 404 to the power cable 431 of the power supply unit 430.

It should be noted that it is also possible for the tubular structures 413, 414 to be attached to the display frame 402 instead of to the display unit 401 in another example. In this example, the display unit 401 includes corresponding holes or sockets to receive the tubular structures 413, 414. Accordingly, the power cable 431 from the power supply unit 430 may be fixed to the conducting ring 501 by welding, and the power cable 432 from the display unit 401 contacts the conducting ring 501 using brush contacts. Other types of implementing the pivotal means 410, 411 are also possible as known to one of ordinary skill in the art.

In the embodiments and examples described above, the wireless transmission system has been described using optical transmission means, specifically, using modulated light for transmitting data wirelessly. Other means of transmitting data wirelessly, for example transmission using Radio Frequency, is also possible according to other embodiments.

Figure 9:
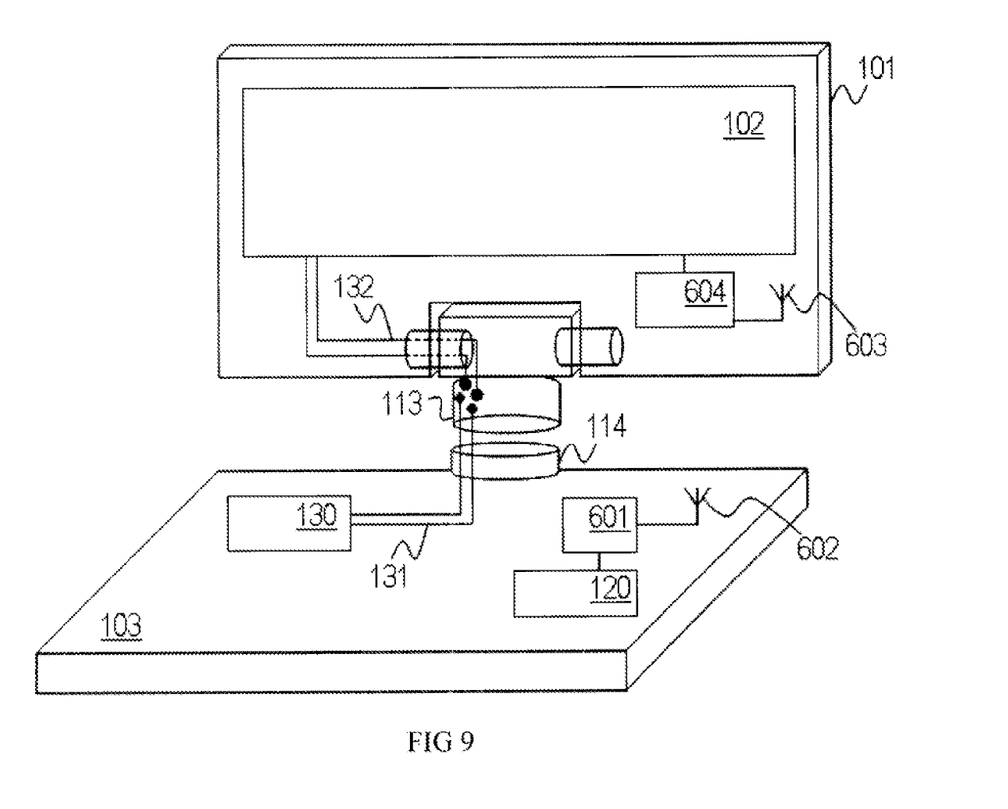
FIG. 9 shows an example of an implementation of the rotatable display assembly using Bluetooth for transmitting data wirelessly according to an embodiment.

FIG. 9 shows an example of an implementation of the rotatable display assembly using Bluetooth for transmitting data wirelessly according to an embodiment. In this embodiment, the base unit 103 includes the graphic controller 120, a first Bluetooth controller 601 and a first Bluetooth radio transceiver 602. The display unit 101 includes the LCD screen 102, a second Bluetooth controller 604 and a second BT radio transceiver 603.

The graphics controller 120 is electrically coupled to the first Bluetooth controller 601, and the first Bluetooth controller 601 is electrically coupled to the first Bluetooth radio transceiver 602. The second Bluetooth radio transceiver 603 is electrically coupled to the second Bluetooth controller 604, and the second Bluetooth controller 604 is electrically coupled to the LCD screen 102. Accordingly, data is transmitted wirelessly between the two Bluetooth radio transceivers 602, 603. Since Bluetooth employs Radio Frequency for data transmission, the two Bluetooth radio transceivers 602, 603 need not be arranged in line of sight to each other. They only need to be within certain distance from each other.

Although the present invention has been described in accordance with the embodiments as shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed:

1. A rotatable display assembly comprising:
   a base unit;
   a display unit, wherein the display unit is rotatably coupled to the base unit using at least one hinge; and
   a wireless transmission system adapted to transmit data wirelessly between the base unit and the display unit, having a first optical transceiver in the base unit and a second optical transceiver in the display unit, wherein the second optical transceiver is in a line of sight to the first of transceiver, and wherein the at least one hinge is adapted to allow an unlimited angle of rotation of the display unit with respect to the base unit.

2. The rotatable display assembly of claim 1, wherein the at least one hinge comprises a first tubular structure attached to the display unit and a second tubular structure attached to the base unit, the first tubular structure being rotatable with respect to the second tubular structure about a vertical axis when the base unit is horizontal, wherein optical signals are transmitted between the first optical transceiver and the second optical transceiver in a direction parallel to the vertical axis.

3. The rotatable display assembly of claim 1, wherein the wireless transmission system comprises an optical transmission system, the optical transmission system comprises at least one optical transceiver in the display unit and at least one optical transceiver in the base unit, wherein data is transmitted as optical signal between the optical transceivers in the base unit and the display unit through the at least one hinge.

4. The rotatable display assembly of claim 3, further comprising:
   a video graphic controller for outputting video signal for display;
   a modulating unit that is electrically coupled to the video graphic controller for modulating the video signal into optical signal;
   an optical transmitter that is electrically coupled to the modulating unit transmitting the optical signal;
   an optical receiver that is optically coupled to the optical transmitter for receiving the optical signal from the optical transmitter;
   a demodulating unit that is electrically coupled to the optical receiver for demodulating the received optical signal into the video signal; and
   a display that is electrically coupled to the demodulating unit for displaying a visual representation of the video signal.

5. The rotatable display assembly of claim 1, wherein the at least one pivotal means is pivotable about a vertical axis when the base unit is horizontal and wherein the wireless transmission system comprises a first optical transceiver in the base unit and a second optical transceiver in the display unit, wherein optical signals are transmitted between the first optical transceiver and the second optical transceiver along a single axis in a direction parallel to the vertical axis.

6. The rotatable display assembly of claim 1, wherein the at least one hinge is pivotable about a vertical axis when the base unit is horizontal and wherein optical signals are transmitted between the first optical transceiver and the second optical transceiver along a single axis in a direction parallel to the vertical axis.

7. A rotatable display assembly comprising:
   a base unit;
   a display unit, wherein the display unit is rotatably coupled to the base unit using at least one hinge, wherein the at least one hinge comprises:
   a tubular structure having an electrically conducting portion, wherein a first end of the tubular structure is coupled to the display unit and a second end of the tubular structure is coupled to the base unit; and
   a wireless transmission system adapted to transmit data wirelessly between the base unit and the display unit, wherein the at least one hinge is adapted to allow an unlimited angle of rotation of the display unit with respect to the base unit.

8. The rotatable display assembly of claim 7, further comprises:
   a first electrical cable from the base unit that is electrically coupled to a first surface of the electrically conducting portion of the tubular structure; and
   a second electrical cable from the display unit that is electrically coupled to a second surface of the electrically conducting surface of the tubular structure, such that the first electrical cable is electrically coupled to the second electrical cable, thereby supplying power from a power source in the base unit to the display unit through the at least one hinge.

9. The rotatable display assembly of claim 7, wherein the tubular structure is rotatable with respect to the base unit or the display unit.

10. A portable computer comprising:
    a base unit;
    a display unit, wherein the display unit is rotatably coupled to the base unit using at least one pivotal means; and
    a wireless transmission system adapted to transmit data wirelessly between the base unit and the display unit, having a first optical transceiver in the base unit and a second optical transceiver in the display unit, wherein the second optical transceiver is in a line of sight to the first of transceiver, and wherein the at least one pivotal means is adapted to allow an unlimited angle of rotation of the display unit with respect to the base unit.

11. The portable computer of claim 10, wherein the wireless transmission system comprises an optical transmission system, the optical transmission system comprises at least one optical transceiver in the display unit and at least one optical transceiver in the base unit, wherein data is transmitted as optical signal between the optical transceivers in the base unit and the display unit through the at least one pivotal means.

12. The portable computer of claim 11, further comprising:
a video graphic controller for outputting video signal for display;
a modulating unit that is electrically coupled to the video graphic controller for modulating the video signal into optical signal;
an optical transmitter that is electrically coupled to the modulating unit for transmitting the optical signal;
an optical receiver that is optically coupled to the optical transmitter for receiving the optical signal from the optical transmitter;
a demodulating unit that is electrically coupled to the optical receiver for demodulating the received optical signal into the video signal; and
a display that is electrically coupled to the demodulating unit for displaying a visual representation of the video signal.

13. A portable computer comprising:
a base unit
a display unit, wherein the display unit is rotatably coupled to the base unit using at least one pivotal means, wherein the pivotal means comprises:
a tubular structure having an electrically conducting portion, wherein a first end of the tubular structure is coupled to the display unit and a second end of the tubular structure is coupled to the base unit;
a first electrical cable from the base unit that is electrically coupled to a first surface of the electrically conducting portion of the tubular structure; and
a second electrical cable from the display unit that is electrically coupled to a second surface of the electrically conducting surface of the tubular structure, such that the first electrical cable is electrically coupled to the second electrical cable, thereby supplying power from a power source in the base unit to the display unit through the pivotal means; and
a wireless transmission system adapted to transmit data wirelessly between the base unit and the display unit, wherein the at least one pivotal means is adapted to allow an unlimited angle of rotation of the display unit with respect to the base unit.

14. The portable computer of claim 13, wherein the tubular structure is rotatable with respect to the base unit or the display unit.

15. A rotatable display assembly comprising:
a base unit;
a display unit, wherein the display unit is rotatably coupled to the base unit using at least one hinge, wherein the at least one hinge comprises a first tubular structure attached to the display unit and a second tubular structure attached to the base unit, the first tubular structure being rotatable with respect to the second tubular structure about a vertical axis when the base unit is horizontal, wherein optical signals are transmitted between the first optical transceiver and the second optical transceiver in a direction parallel to the vertical axis, wherein the first tubular structure comprises a first electrically conductive ring and wherein the second tubular structure comprises a second electrically conductive ring, wherein electrical power is transmittable between the first electrically conductive ring and the second electrically conductive ring to supply power to the display unit; and
a wireless transmission system adapted to transmit data wirelessly between the base unit and the display unit, wherein the at least one hinge is adapted to allow an unlimited angle of rotation of the display unit with respect to the base unit.

16. A rotatable display assembly comprising:
a base unit; a display unit, wherein the display unit is rotatably coupled to the base unit using at least one pivotal means, wherein the pivotal means comprises a tubular structure having an electrically conducting portion, wherein a first end of the tubular structure is coupled to the display unit and a second end of the tubular structure is coupled to the base unit;
a wireless transmission system adapted to transmit data wirelessly between the base unit and the display unit;
a first electrical cable from the base unit that is electrically coupled to a first surface of the electrically conducting portion of the tubular structure; and
a second electrical cable from the display unit that is electrically coupled to a second surface of the electrically conducting surface of the tubular structure, such that the first electrical cable is electrically coupled to the second electrical cable, thereby supplying power from a power source in the base unit to the display unit through the pivotal means.

17. The rotatable display assembly of claim 16, wherein the first and of the tubular structure is rotatable with respect to the second end of the tubular structure about a vertical axis when the base unit is horizontal, wherein the wireless transmission system comprises a first optical transceiver in the base unit and a second optical transceiver in the display unit, and wherein optical signals are transmitted between the first optical transceiver and the second optical transceiver along a single axis in a direction parallel to the vertical axis.

* * * * *